United States Patent [19]
Spöring

[11] Patent Number: 5,217,367
[45] Date of Patent: Jun. 8, 1993

[54] HEATING DRUM FOR RECEIVING A PRINTING BLANKET TO BE VULCANIZED

[75] Inventor: Günter Spöring, Northeim, Fed. Rep. of Germany

[73] Assignee: Continental Aktiengesellschaft, Hannover, Fed. Rep. of Germany

[21] Appl. No.: 835,712

[22] Filed: Feb. 12, 1992

[30] Foreign Application Priority Data

Feb. 22, 1991 [DE] Fed. Rep. of Germany ....... 4105560

[51] Int. Cl.⁵ .............................. F23B 7/00; F23B 7/28
[52] U.S. Cl. .................................... 432/103; 432/118; 432/119
[58] Field of Search ............... 432/103, 104, 105, 118, 432/119

[56] References Cited

U.S. PATENT DOCUMENTS 4,988,290 1/1991 Forster et al. ...................... 432/103

Primary Examiner—Henry C. Yuen
Attorney, Agent, or Firm—Robert W. Becker & Associates

[57] ABSTRACT

A heating drum for receiving a printing blanket to be vulcanized in a pressure chamber is comprised of a hollow drum body formed of a thin drum wall having a separating slot that extends parallel to the axis of the drum body. The drum body is hollow and made of a thin wall in order to reduce pressure tensions within the printing blanket coil during vulcanization. The separating slot is covered by a sheet metal tongue which is connected with one side to the thin wall along the separating slot while the oppositely arranged free end rests in a pre-stressed manner on the outer mantle surface of the drum body.

8 Claims, 1 Drawing Sheet

HEATING DRUM FOR RECEIVING A PRINTING BLANKET TO BE VULCANIZED

BACKGROUND OF THE INVENTION

The present invention relates to a heating drum for receiving, respectively winding thereon, a printing blanket to be vulcanized in a pressure chamber, whereby the printing blanket is provided with a cover layer of elastomeric material.

The quality of printing blankets has to meet increasingly stringent requirements in order to provide flawless printing products.

It has been known to wind the preconfected printing blanket blank onto a heating drum and to vulcanize the coiled printing blanket in a pressure chamber.

However, it has been shown that the sensitive printing blankets often have defects in their cover layers after the vulcanization step due to imprints of the contacting points (where the leading edge of the printing blanket rests on the heating drum) of the printing blanket coil. Furthermore, the surface relief or stamping generated by the commonly provided relief cardboard, wound together with the printing blanket onto the heating drum, is stronger in the inner windings than in the outer windings of the coil.

The imprints generated by the contacting points and the reliefs or stampings generated by the relief cardboard with differing strengths from the inside of the coil to the outside are a result of the vulcanization of the printing blanket coil causing a higher pressure tension in the interior of the coil because the great heat expansion of the heating drum and the coil during the vulcanization step increases the inner pressure of the printing blanket coil. The increase of the diameter of the heating drum causes an increased imprint of the contacting point in the first few windings of the printing blanket which necessitates discharge of these first windings because they are unsuitable for printing.

It is therefore an object of the present invention to provide a heating drum of the aforementioned kind with which it is possible to minimize detrimental imprints and reliefs of varying strength.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
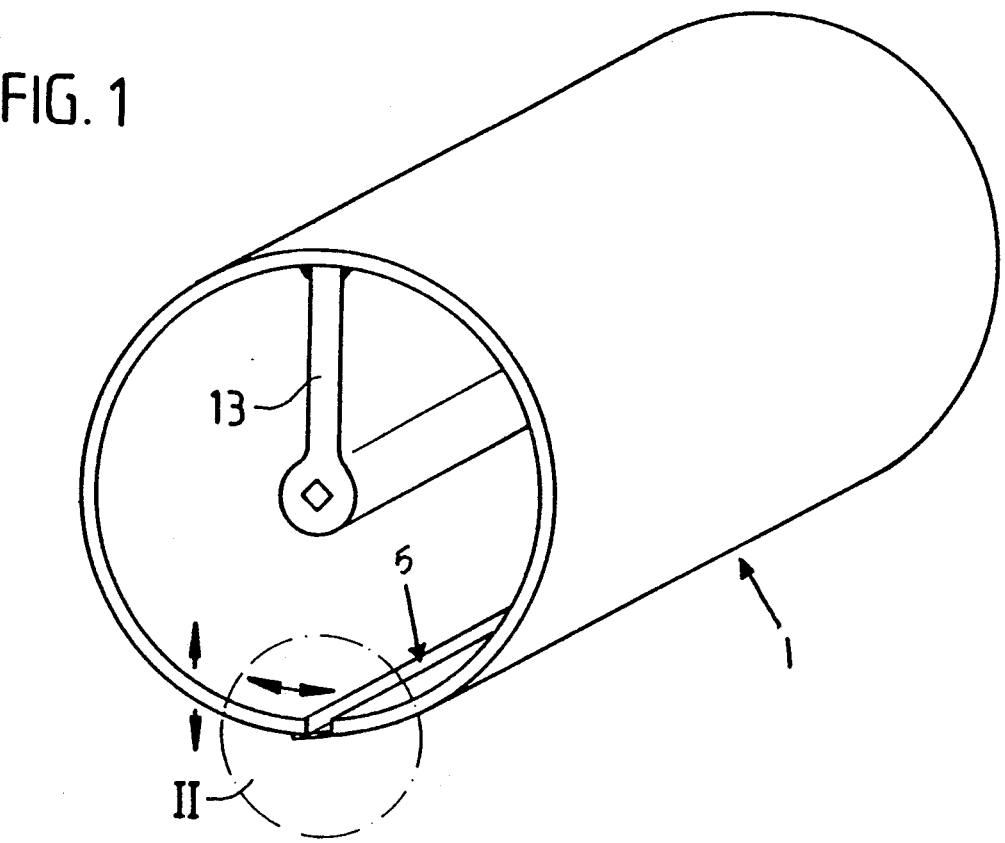
FIG. 1 shows a heating drum in a perspective side view.

The heating drum of the present invention is primarily characterized by a hollow drum body formed of a thin drum wall having a separating slot extending parallel to an axis of the drum body; and a sheet metal tongue for covering the separating slot, the sheet metal tongue being connected with a first side thereof to one end of the thin drum wall adjacent to the separating slot and with a free end thereof resting in a prestressed manner on an outer mantle surface of the drum body.

The heat expansion of the heating drum during the vulcanization step accordingly results in a reduced diameter enlargement of the heating drum. Pressure tensions within the coil are reduced because the heat expansion may be compensated to a large extent by the separating slot which is covered by the sheet metal tongue. The sheet metal tongue which is attached with one side may compensate the heat expansion of the heating drum and of the coil with its free end that is resting on the outer mantle surface of the drum body.

The vulcanization pressure within the printing blanket coil is thus more uniformly distributed over its cross-section which results in a reduction of the differences of strength of the imprints or reliefs resulting from the relief cardboard and in reduced imprints at the contacting points.

In a preferred embodiment of the present invention the thickness of the sheet metal tongue is equal or approximately identical to the thickness of the printing blanket. Due to this measure a contacting point at the heating drum is created which will not cause any imprints in the printing blanket.

In a further embodiment of the present invention, the thin drum wall, in an area where the free end of the sheet metal tongue rests on the outer mantle surface of the drum body, is recessed such that an imaginary line corresponding to the curvature of the drum body extends through the sheet metal tongue. Accordingly, the thin wall of the drum body at the side opposite the connection of the sheet metal tongue to the end face of the wall is machined such that the sheet metal tongue is immersed in the outer mantle surface of the heating drum such that the curvature is essentially continuous.

Furthermore, a spacing element that penetrates the thin drum wall in an area where the free end of the sheet metal tongue rests on the outer mantle surface of the drum body is provided and acts on the free end of the sheet metal tongue. Preferably, the spacing element is a threaded screw. The radially acting spacing element allows the clamping of the relief cardboard.

The inventive feeding drum further comprises an inner centering support that extends radially and parallel to the axis of the drum body, the centering support being connected to the thin drum wall and serving to support the drum wall on the rotating spindle of the heating drum. Preferably, the centering support is arranged opposite the separating slot.

With the present invention a heating drum is provided with which a wound printing blanket may be vulcanized such that no detrimental imprints or imprints of varying strength are observed

DESCRIPTION OF PREFERRED EMBODIMENTS

Figure 2:
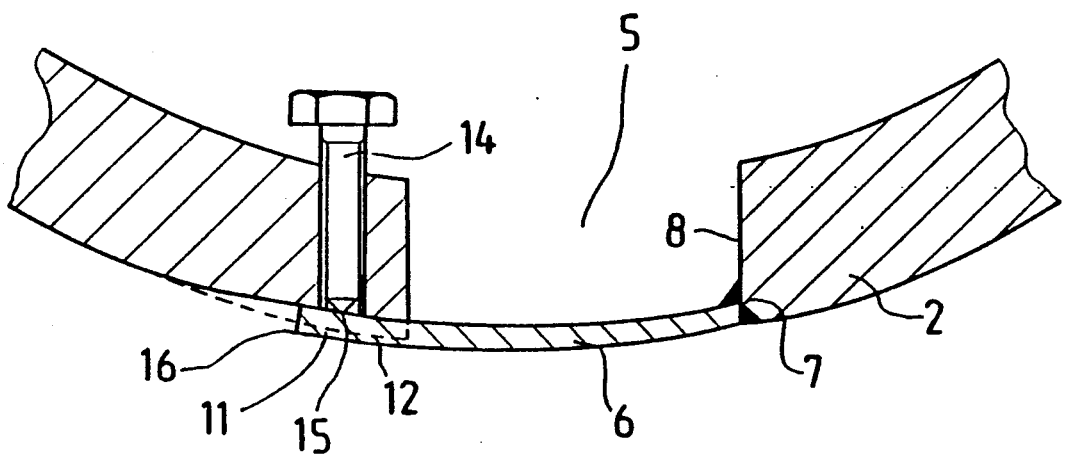
FIG. 2 shows an enlarged detail of FIG. 1.

The present invention will now be described in detail with the aid of the specific embodiment represented in FIGS. 1 and 2.

The heating drum is provided with a cylindrical thin drum wall 2 which is supported by a central support 13 on a respective rotating spindle, the central support 13 extending radially and parallel to the axis of the heating drum.

The cylindrical thin drum wall 2 is separated by a separating slot 5 which extends essentially parallel to the axis of the heating drum. The centering support 13 is arranged opposite the separating slot 5 which serves as an expansion slot.

The separating slot 5 is covered by a sheet metal tongue 6 which with a first side 7 thereof is connected (welded) to the end face 8 of the thin drum wall 2. The sheet metal tongue 6 is aligned with the outer mantle surface of the drum body 1.

The oppositely arranged free end 11 of the sheet metal tongue 6 rests in a pre-stressed manner on the outer mantle surface of the drum body 1. In this area, the thin drum wall 2 is machined such that it is recessed with respect to the imaginary line of curvature 12, indicated in FIG. 2, in order to provide a continuous curvature of the outer mantle surface serving as the winding surface when the free end 11 rests on the recessed portion. The thin drum wall 2 is penetrated by a spacing element 14, embodied as a screw, in the area of contact of the free end 11 at the outer mantle surface. The tip of the screw 14 acts on the inner surface of the free end 11 of the sheet metal tongue 6.

The thickness of the sheet metal tongue 6 is only slightly greater than the thickness of the printing blanket blank which, when applied to the heating drum, abuts the face 16.

The function of the above described heating drum is as follows:

The spacing element or screw 14 is turned such that its tip 15 penetrates the outer mantle surface of the drum body 1. Accordingly, the free end 11 of the sheet metal tongue 6 is lifted off the outer mantle surface. Into the slot, which is created between the outer mantle surface and the inner surface of the free end 11, the beginning of the relief cardboard is positioned. The screw 14 is turned such that the relief cardboard is clamped by the sheet metal tongue 6 which is mounted under pre-stress. The leading edge of the printing blanket blank is then abutted against the face 16 of the sheet metal tongue 6 and is fastened with a double-sided adhesive tape to the clamped relief cardboard. The relief cardboard and the printing blanket blank are then wound onto the heating drum.

The finished coil is then vulcanized in a pressure chamber under the influence of hot air in a known manner. After the vulcanization and removal of the finished printing blanket it was found that the inner windings of the printing blanket fulfill the quality requirements for a printing blanket, i.e., the inner windings meet the same quality standards as the outer windings. An imprint of the contacting points was not observed so that the entire length of the printing blanket was usable as a finished product.

Due to the one-sided centering support 13 and its arrangement opposite the separating slot 5, a great deformability of the drum body, respectively, its thin drum wall, is achieved which results in a compensation for pressure tension.

The present invention is, of course, in no way restricted to the specific disclosure of the specification and drawings, but also encompasses any modifications within the scope of the appended claims.

What I claim is:

1. A heating drum for receiving a printing blanket to be vulcanized in a pressure chamber, the printing blanket having a cover layer of elastomeric material, said heating drum being comprised of:
    a hollow drum body formed of a thin drum wall having a separating slot extending parallel to an axis of said drum body; and
    a sheet metal tongue for covering said separating slot, said sheet metal tongue being connected with a first side thereof to one end face of said thin drum wall adjacent to said separating slot and with a free end thereof resting in a pre-stressed manner on an outer mantle surface of said drum body.

2. A heating drum according to claim 1, wherein a thickness of said sheet metal tongue is approximately identical to a thickness of the printing blanket.

3. A heating drum according to claim 1, wherein a thickness of said sheet metal tongue is equal to a thickness of the printing blanket.

4. A heating drum according to claim wherein said thin drum wall, in an area where said free end of said sheet metal tongue rest on said outer mantle surface of said drum body, is recessed such that an imaginary line corresponding to a curvature of said drum body extends through said sheet metal tongue.

5. A heating drum according to claim 1, further comprising a spacing element penetrating said thin drum wall in an area where said free end of said sheet metal tongue rest on said outer mantle surface of said drum body and acting on said free end of said sheet metal tongue.

6. A heating drum according to claim 5, wherein said spacing element is a threaded screw.

7. A heating drum according to claim 1, further comprising an inner centering support that extends radially and parallel to said axis of said drum body, said centering support being connected to said thin drum wall and serving to support said drum wall on a rotating spindle of said heating drum.

8. A heating drum according to claim 7, wherein said centering support is arranged opposite said separating slot.

* * * * *